US012585582B2

(12) United States Patent
Ueda

(10) Patent No.: US 12,585,582 B2
(45) Date of Patent: Mar. 24, 2026

(54) POWER-LOSS PROTECTION FOR ADDRESS CONVERSION TABLE USING A CHARGED CAPACITOR IN A STORAGE DEVICE

(71) Applicant: Kioxia Corporation, Tokyo (JP)

(72) Inventor: Koji Ueda, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/771,940

(22) Filed: Jul. 12, 2024

(65) Prior Publication Data

US 2025/0028633 A1 Jan. 23, 2025

(30) Foreign Application Priority Data

Jul. 18, 2023 (JP) ................................. 2023-117050

(51) Int. Cl.
*G06F 12/02* (2006.01)
*G06F 12/1009* (2016.01)
(52) U.S. Cl.
CPC ...... *G06F 12/0246* (2013.01); *G06F 12/0292* (2013.01); *G06F 12/1009* (2013.01)
(58) Field of Classification Search
None
See application file for complete search history.

(56) References Cited

U.S. PATENT DOCUMENTS

| | | | | |
|---|---|---|---|---|
| 5,341,503 A | * | 8/1994 | Gladstein ........... | G01R 31/3648 |
| | | | | 713/340 |
| 9,830,257 B1 | * | 11/2017 | Booth ................ | G11C 14/0018 |
| 2006/0112296 A1 | * | 5/2006 | Sheahan ............. | G06F 11/1441 |
| | | | | 714/E11.13 |
| 2007/0074053 A1 | * | 3/2007 | Bulusu .................... | G06F 1/305 |
| | | | | 714/E11.138 |
| 2016/0070336 A1 | | 3/2016 | Kojima | |
| 2017/0068488 A1 | * | 3/2017 | Shibatani ............... | G11C 16/10 |
| 2018/0059761 A1 | | 3/2018 | An | |
| 2018/0300239 A1 | * | 10/2018 | Hsu ....................... | G06F 3/0619 |
| 2021/0074336 A1 | | 3/2021 | Kumagai | |
| 2021/0141433 A1 | * | 5/2021 | Watt .................... | G06F 11/1076 |

* cited by examiner

*Primary Examiner* — Kevin Verbrugge
(74) *Attorney, Agent, or Firm* — Kim & Stewart LLP

(57) ABSTRACT

A storage device includes a non-volatile memory, a controller that controls the non-volatile memory, a volatile memory, a power supply circuit that generates a power supply voltage using power supplied from an external power supply, and a capacitor. The controller determines after first data residing in the volatile memory has been stored into the non-volatile memory using the capacitor as a backup power supply in response to a power loss event, whether an amount of charge remaining in the capacitor is sufficient to store second data residing in the volatile memory into the non-volatile memory, and stores the second data residing in the volatile memory into the non-volatile memory if the amount of charge remaining in the capacitor is determined to be sufficient.

12 Claims, 5 Drawing Sheets

Figure 4:
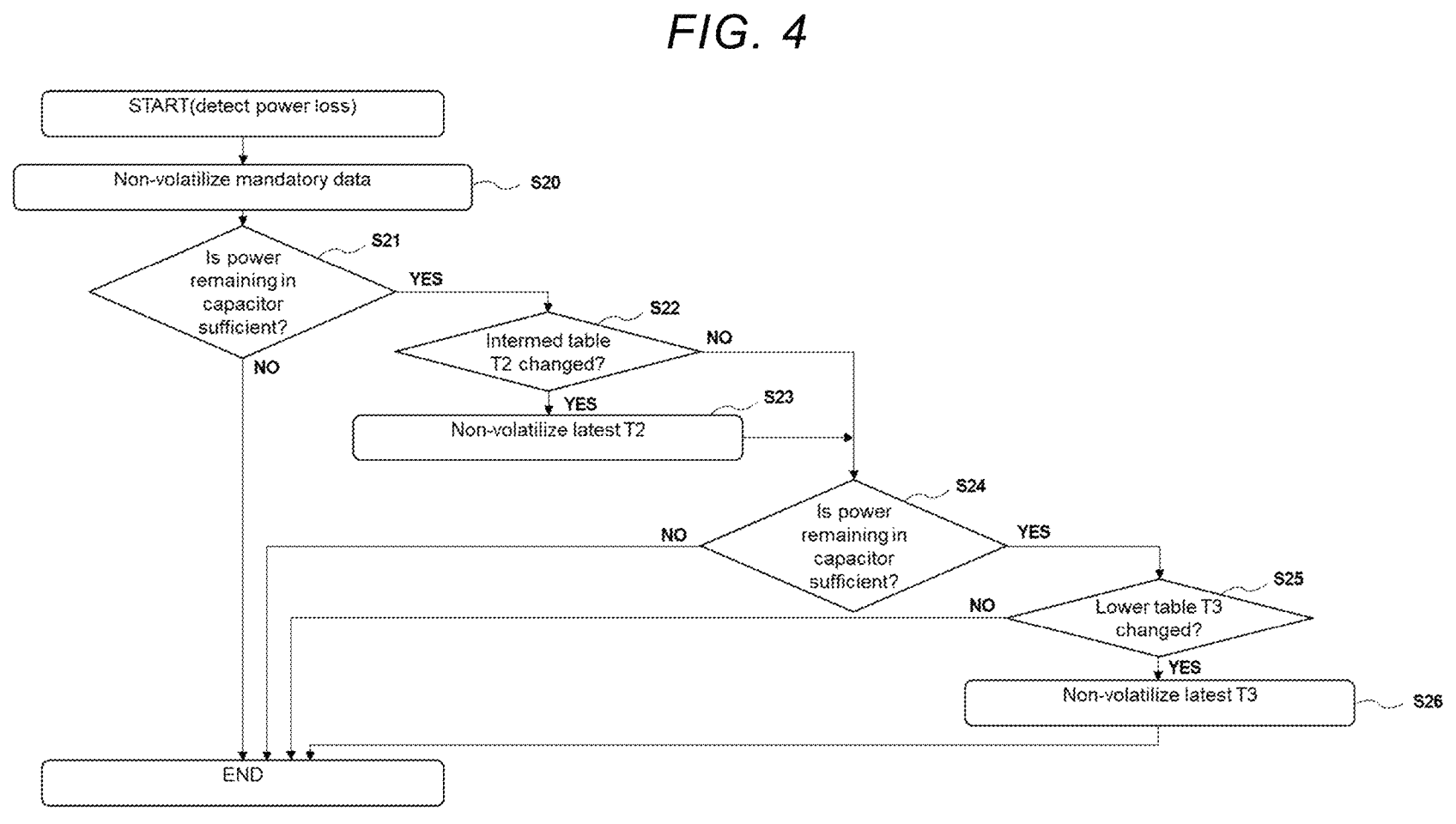

START (detect power loss)

Non-volatilize mandatory data — S20

S21 — Is power remaining in capacitor sufficient?

NO → END

YES ↓

S22 — Intermed table T2 changed?

NO →

YES ↓

S23 — Non-volatilize latest T2

S24 — Is power remaining in capacitor sufficient?

NO → END

YES ↓

S25 — Lower table T3 changed?

NO → END

YES ↓

S26 — Non-volatilize latest T3

END

POWER-LOSS PROTECTION FOR ADDRESS CONVERSION TABLE USING A CHARGED CAPACITOR IN A STORAGE DEVICE

CROSS-REFERENCE TO RELATED APPLICATION(S)

This application is based upon and claims the benefit of priority from Japanese Patent Application No. 2023-117050, filed Jul. 18, 2023, the entire contents of which are incorporated herein by reference.

FIELD

Embodiments described herein relate generally to a storage device and a control method thereof.

BACKGROUND

In a storage device having a power loss protection (PLP) function, it is desirable to reduce the amount of data non-volatilized during PLP processing in order to reduce the size of a PLP capacitor. However, when the amount of data non-volatilized during the PLP processing is reduced, there is a concern that the boot-up time when starting up the storage device thereafter may be longer.

In addition, the PLP capacitor deteriorates over time. At its early stage, the PLP capacitor may be used to execute both mandatory PLP processing and additional PLP processing. However, later in its lifetime, the PLP capacitor may only be able to execute the mandatory PLP processing.

DESCRIPTION OF THE DRAWINGS

FIG. 2 is a diagram showing an example of a look-up table (LUT) and user data that are used in the storage device according to the embodiment.

FIG. 4 is a flowchart showing a non-volatilization process carried out by the storage device according to the embodiment in response to a power loss.

DETAILED DESCRIPTION

Figure 1:
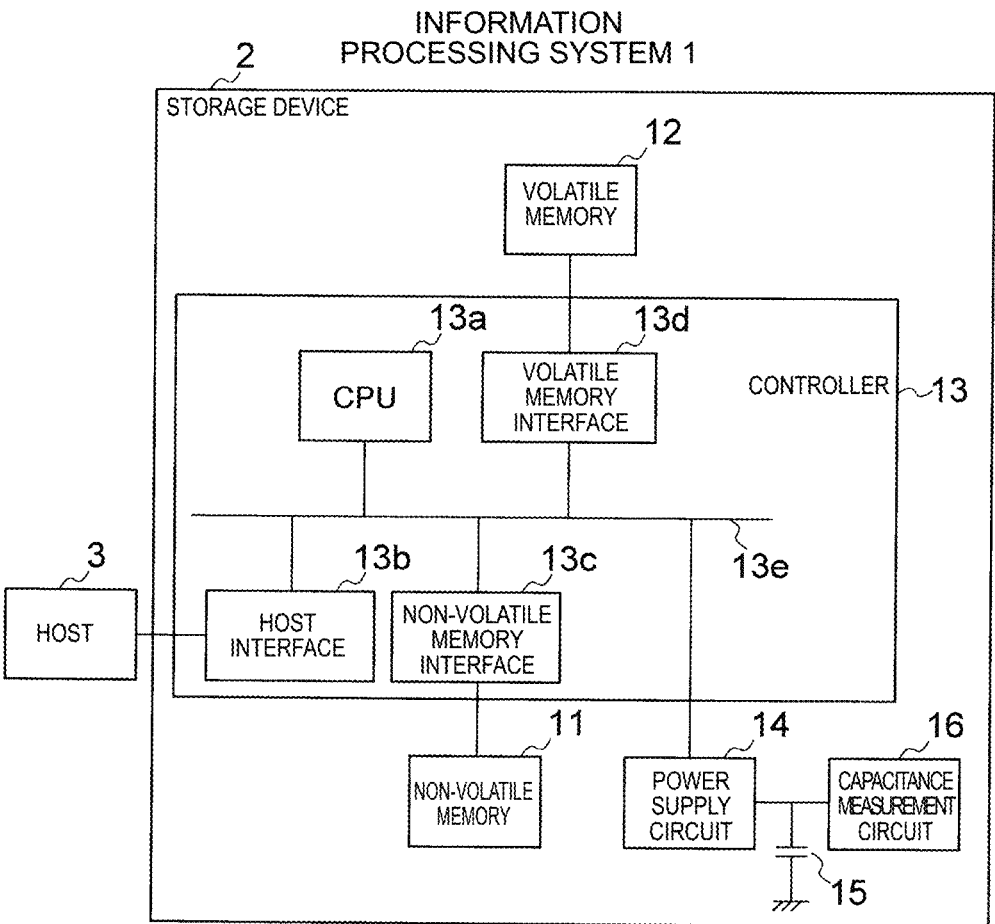
FIG. 1 is a block diagram showing a configuration of an information processing system that includes a storage device according to an embodiment.

Embodiments provide a storage device capable of suitably performing PLP processing and a control method thereof.

In general, according to one embodiment, a storage device includes a non-volatile memory, a controller configured to control the non-volatile memory, a volatile memory, a power supply circuit configured to generate a power supply voltage using power supplied from an external power supply, and a capacitor. The controller is configured to determine after first data residing in the volatile memory has been stored into the non-volatile memory using the capacitor as a backup power supply in response to a power loss event, whether an amount of charge remaining in the capacitor is sufficient to store second data residing in the volatile memory into the non-volatile memory, and to store the second data residing in the volatile memory into the non-volatile memory if the amount of charge remaining in the capacitor is determined to be sufficient.

Hereinafter, embodiments of the present disclosure will be described with reference to the drawings. In FIGS. 1 to 5, the same components are given the same reference numerals.

Embodiment

FIG. 1 is a block diagram showing a configuration of an information processing system 1 that includes a storage device 2 according to an embodiment and a host 3. The storage device 2 is a memory device that functions as a data storage. The storage device 2 is, for example, a semiconductor storage device. The storage device 2 is, for example, a solid state drive (SSD). The storage device 2 has a PLP function. A process performed by the storage device 2 when the PLP function is executed is referred to as PLP processing.

The host 3 is an information processing device outside the storage device 2. The host 3 is, for example, a personal computer (PC). The storage device 2 includes a non-volatile memory 11, a volatile memory 12, a controller 13, a power supply circuit 14, a PLP capacitor 15, and a capacitance measurement circuit 16. The non-volatile memory 11 is a non-volatile memory. The non-volatile memory 11 stores data transmitted from the host 3 to the storage device 2. The volatile memory 12 is a volatile memory. The volatile memory 12 temporarily stores various data.

The controller 13 is a device that controls an operation of the storage device 2. The controller 13 loads data stored in the non-volatile memory 11 into the volatile memory 12.

The power supply circuit 14 is a circuit that generates a power supply voltage used in the storage device 2 by using power supplied from an external power supply (not shown). The power supply circuit 14 is connected to the controller 13, and supplies power to the controller 13 and is controlled by the controller 13.

The PLP capacitor 15 is a capacitor used as a backup power supply of the storage device 2. The charge stored in the PLP capacitor 15 is used as the backup power. When the power supply is cut off while data is being written to the non-volatile memory 11, the data being written is written to the non-volatile memory 11 by using the charge stored in the PLP capacitor 15. The PLP capacitor 15 is electrically connected to the power supply circuit 14.

The capacitance measurement circuit 16 is a circuit that measures the charges stored in the PLP capacitor 15. The capacitance measurement circuit 16 is electrically connected to the power supply circuit 14 and the PLP capacitor 15. The capacitance measurement circuit 16 outputs a measurement result of the charges stored in the PLP capacitor 15 to the power supply circuit 14.

The controller 13 includes a central processing unit (CPU) 13*a*, a host interface 13*b*, a non-volatile memory interface 13*c*, a volatile memory interface 13*d*, and a bus line 13*c*. The CPU 13*a* is a device that performs various information processing. For example, a program stored in the non-volatile memory 11 is loaded into the volatile memory 12 and executed by the CPU 13*a*. The CPU 13*a* can access the non-volatile memory 11 via the non-volatile memory interface 13*c*. The CPU 13*a* can access the volatile memory 12 via the volatile memory interface 13*d*. When accessing the non-volatile memory 11, the CPU 13*a* uses a look-up table loaded into the volatile memory 12.

The host interface 13*b* is an interface for transmitting and receiving data between the host 3 and the storage device 2. The non-volatile memory interface 13*c* is an interface for transmitting and receiving data between the non-volatile memory 11 and the controller 13. The volatile memory interface 13*d* is an interface for transmitting and receiving data between the volatile memory 12 and the controller 13. The bus line 13*e* is a wiring that connects the CPU 13*a*, the host interface 13*b*, the non-volatile memory interface 13*c*, the volatile memory interface 13*d*, and the power supply circuit 14 to each other.

Figure 2:
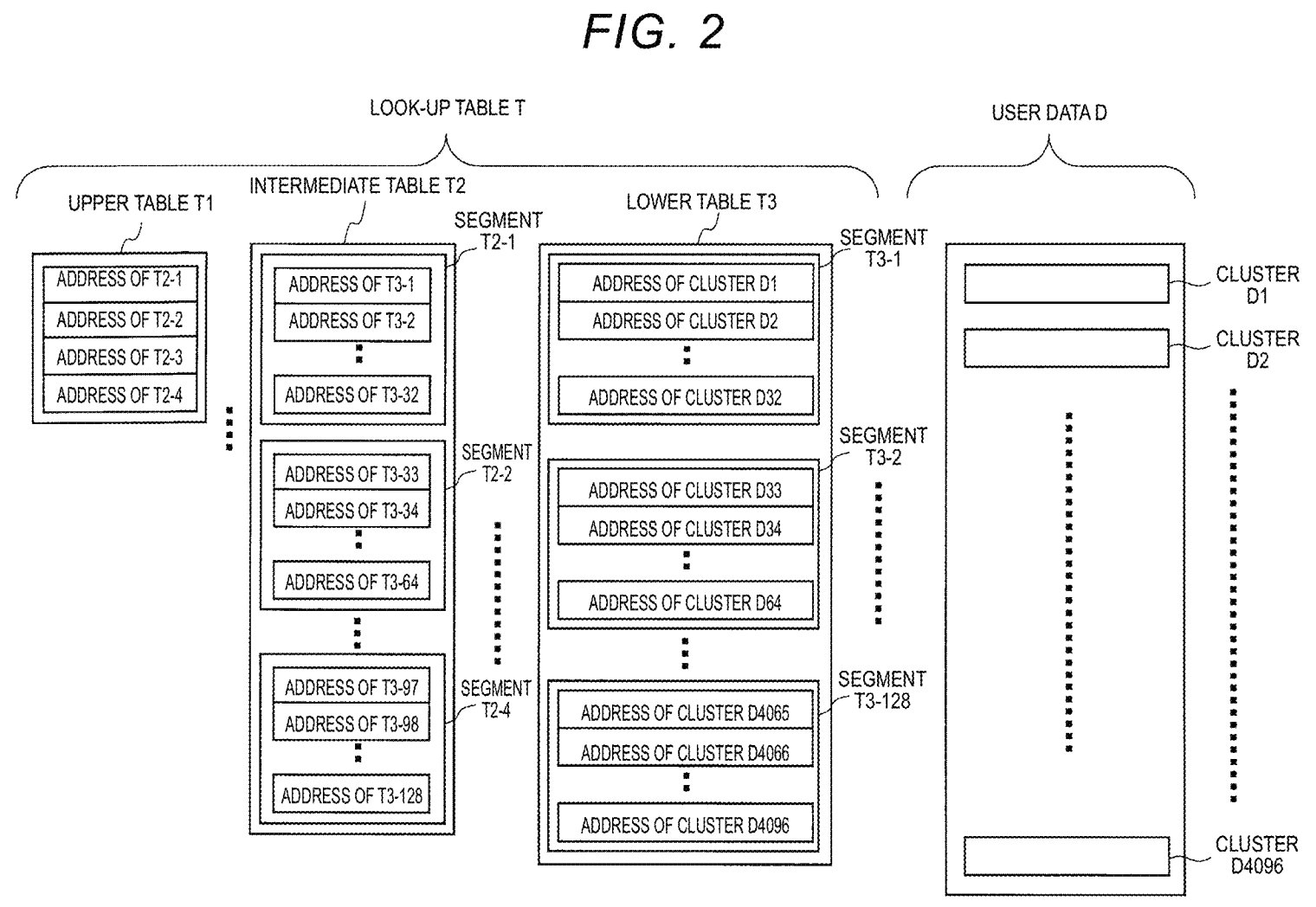

FIG. 2 is a diagram showing an example of a look-up table (LUT) T and user data that are used in the storage device 2 according to the embodiment. The look-up table T is a table that is used by the controller 13 to convert a logical address specified by the host 3 into a physical address of the non-volatile memory 11. The look-up table T may be referred to as a logical-to-physical address conversion table.

User data D is data of a user of the information processing system 1. The user data D is stored in the non-volatile memory 11 in cluster units. Here, the user data D is stored in 4096 clusters, D1 to D4096. The number of clusters of the user data D may be other than 4096.

The look-up table T includes an upper table T1, an intermediate table T2, and a lower table T3. The intermediate table T2 is also referred to as an upper look-up table. The lower table T3 is also referred to as a lower look-up table.

The upper table T1 includes four addresses as physical addresses corresponding to four segments T2-1 to T2-4 of the intermediate table T2. The four addresses are referred to as addresses of the intermediate table T2.

The intermediate table T2 includes 128 addresses as physical addresses corresponding to 128 segments T3-1 to T3-128 of the lower table T3. The 128 addresses are referred to as addresses of the lower table T3. The segment T2-1 includes physical addresses of the segments T3-1 to T3-32. The segment T2-2 includes physical addresses of the segments T3-33 to T3-64. The segment T2-3 (not shown) includes physical addresses of the segments T3-65 to T3-96. The segment T2-4 includes physical addresses of the segments T3-97 to T3-128. As described above, each segment of the intermediate table T2 includes the physical addresses of 32 segments of the lower table T3.

The lower table T3 includes 4096 addresses as physical addresses of the 4096 clusters D1 to D4096 of the user data D. The 4096 addresses are referred to as addresses of the user data D. Each segment of the lower table T3 includes the physical addresses of 32 clusters of the user data D.

The look-up table T is stored in the volatile memory 12 for access by the CPU 13*a*. For example, the CPU 13*a* updates the look-up table T in the volatile memory 12. During normal operation, the intermediate table T2 and the lower table T3 are non-volatilized, i.e., stored into the non-volatile memory 11, periodically. The normal operation is an operation performed while power is supplied from the external power supply to the storage device 2.

Figure 3:
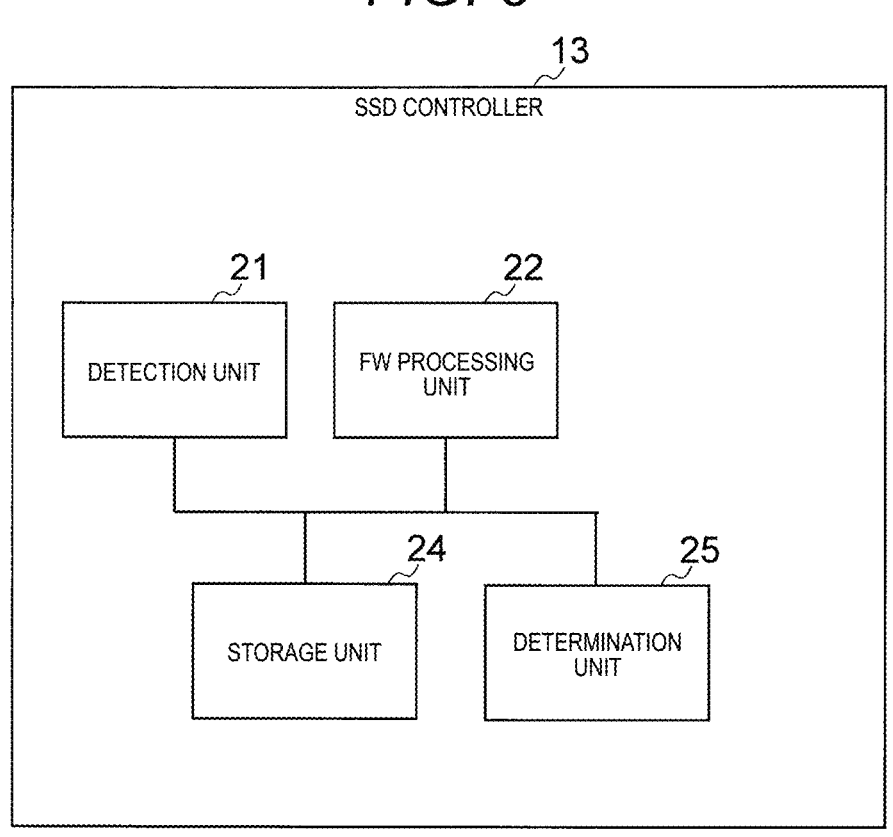
FIG. 3 is a block diagram showing a functional configuration of a controller in the storage device according to the embodiment.

FIG. 3 is a block diagram showing a functional configuration of the controller 13. The functional units of the controller 13 include a detection unit 21, a firmware (FW) processing unit 22, a storage unit 24, and a determination unit 25. The functions of these functional units may be realized, for example, by firmware stored in the non-volatile memory 11 that is loaded into the volatile memory 12 and executed by the CPU 13*a*.

The detection unit 21 is a functional unit that detects various FW events generated in the storage device 2. For example, the detection unit 21 detects power loss as an FW event. The detection unit 21 may detect the power loss according to a signal from the power supply circuit 14.

The FW processing unit 22 is a functional unit that performs FW processing, which is processing related to the firmware of the storage device 2. For example, the FW processing unit 22 copies, from the non-volatile memory 11 into a FW work memory, which is a region of the volatile memory 12 used during FW processing such as PLP processing, a bitmap that indicates what user data stored in the volatile memory 12 is valid.

The storage unit 24 is a functional unit that performs a non-volatilization process to store at least change logs and valid user data stored in the volatile memory 12 into the non-volatile memory 11. The change logs contain changes made to the lower table T3. The valid user data is received from the host 3 and its logical address is managed in the look-up table T.

The determination unit 25 is a functional unit that determines the amount of charge remaining in the PLP capacitor 15. For example, the determination unit 25 determines the amount of charge remaining in the PLP capacitor 15 after the end of the mandatory PLP processing. The mandatory PLP processing is a part of the PLP processing performed before the determination unit 25 determines the amount of charge remaining in the PLP capacitor 15. On the other hand, the additional PLP processing is a part of the PLP processing performed after the determination unit 25 determines the amount of charge remaining in the PLP capacitor 15.

FIG. 4 is a flowchart showing the non-volatilization process carried out by the storage device 2 according to the embodiment in response to a power loss. The process of FIG. 4 begins when the FW processing unit 22 receives a power loss detection notification from the detection unit 21. Thereafter, at step S20, the storage unit 24 performs a non-volatilization process on mandatory data, which includes the change logs and valid user data stored in the volatile memory 12, to store the mandatory data in the non-volatile memory 11. When the non-volatilization process on the mandatory data has completed, at step S21, the determination unit 25 determines if the amount of charge remaining in the PLP capacitor 15 is sufficient for further non-volatilization.

If the charge remaining in the PLP capacitor 15 is sufficient for further non-volatilization (step S21, YES), then at step S22, the storage unit 24 determines if the intermediate table T2 has changed since its last non-volatilization. If the intermediate table T2 has changed (step S22, Yes), the storage unit 24 at step S23 performs a non-volatilization process on the intermediate table T2 stored in the volatile memory 12, to store it in the non-volatile memory 11. If the intermediate table T2 has not changed (step S22, No), step S24 is executed next.

At step S24, the determination unit 25 determines if the amount of charge remaining in the PLP capacitor 15 is sufficient for further non-volatilization. If the charge remaining in the PLP capacitor 15 is sufficient for further non-volatilization (step S24, YES), then at step S25, the storage unit 24 determines if the lower table T3 has changed since its last non-volatilization. If the lower table T3 has changed (step S25, Yes), the storage unit 24 at step S26 performs a non-volatilization process on the lower table T3 stored in the volatile memory 12, to store it in the non-volatile memory 11. If the lower table T3 has not changed (step S25, No), the process ends.

Returning to step S21, if the charge remaining in the PLP capacitor 15 is not sufficient for further non-volatilization (step S21, No), the process ends. Similarly, if it is determined at step S24, the charge remaining in the PLP capacitor 15 is not sufficient for further non-volatilization (step S24, No), the process ends. In such cases, the latest intermediate table T2 and/or the latest lower table T3 is discarded.

After power is supplied again, if the latest intermediate table T2 was non-volatilized during the normal operation or the PLP processing and the latest lower table T3 was non-volatilized during the normal operation or the PLP processing, the intermediate table T2 and the lower table T3 are restored (loaded into the volatile memory 12 for access by the CPU 13a) from the latest versions of the intermediate table T2 and the lower table T3 stored in the non-volatile memory 11.

On the other hand, if the latest intermediate table T2 was not non-volatilized during the normal operation or the PLP processing and the latest lower table T3 was not non-volatilized during the normal operation or the PLP processing, the lower table T3 is restored from the last non-volatilized lower table T3 stored in the non-volatile memory 11 and the change logs, which were non-volatilized during the mandatory PLP processing, stored in the non-volatile memory 11, and the intermediate table T2 is restored from the last non-volatilized intermediate table T2 stored in the non-volatile memory 11 and the restored lower table T3.

If the latest intermediate table T2 was non-volatilized during the normal operation or the PLP processing and the latest lower table T3 was not non-volatilized during the normal operation or the PLP processing, the lower table T3 is restored from the last non-volatilized lower table T3 stored in the non-volatile memory 11 and the change logs stored in the non-volatile memory 11, and the intermediate table T2 is restored from the latest version of the intermediate table T2 stored in the non-volatile memory 11.

It should be noted that even if the latest intermediate table T2 and/or the latest lower table T3 was lost as a result of power loss, they can be restored. However, it takes a longer time than a case where they were non-volatilized upon power loss.

It is possible to use a relatively large PLP capacitor, so that it can be ensured that the latest intermediate table T2 and the latest lower table T3 can be non-volatilized upon power loss, even in the later stages of its lifetime. However, the advantage of having the shorter boot-up time after power loss is offset by higher cost of the larger PLP capacitor. On the other hand, using a relatively small capacitor saves cost, but the latest intermediate table T2 and the latest lower table T3 may not be able to be non-volatilized upon power loss during the later stages of its lifetime. As a result, the boot-up time after power loss may be longer.

Figure 5:
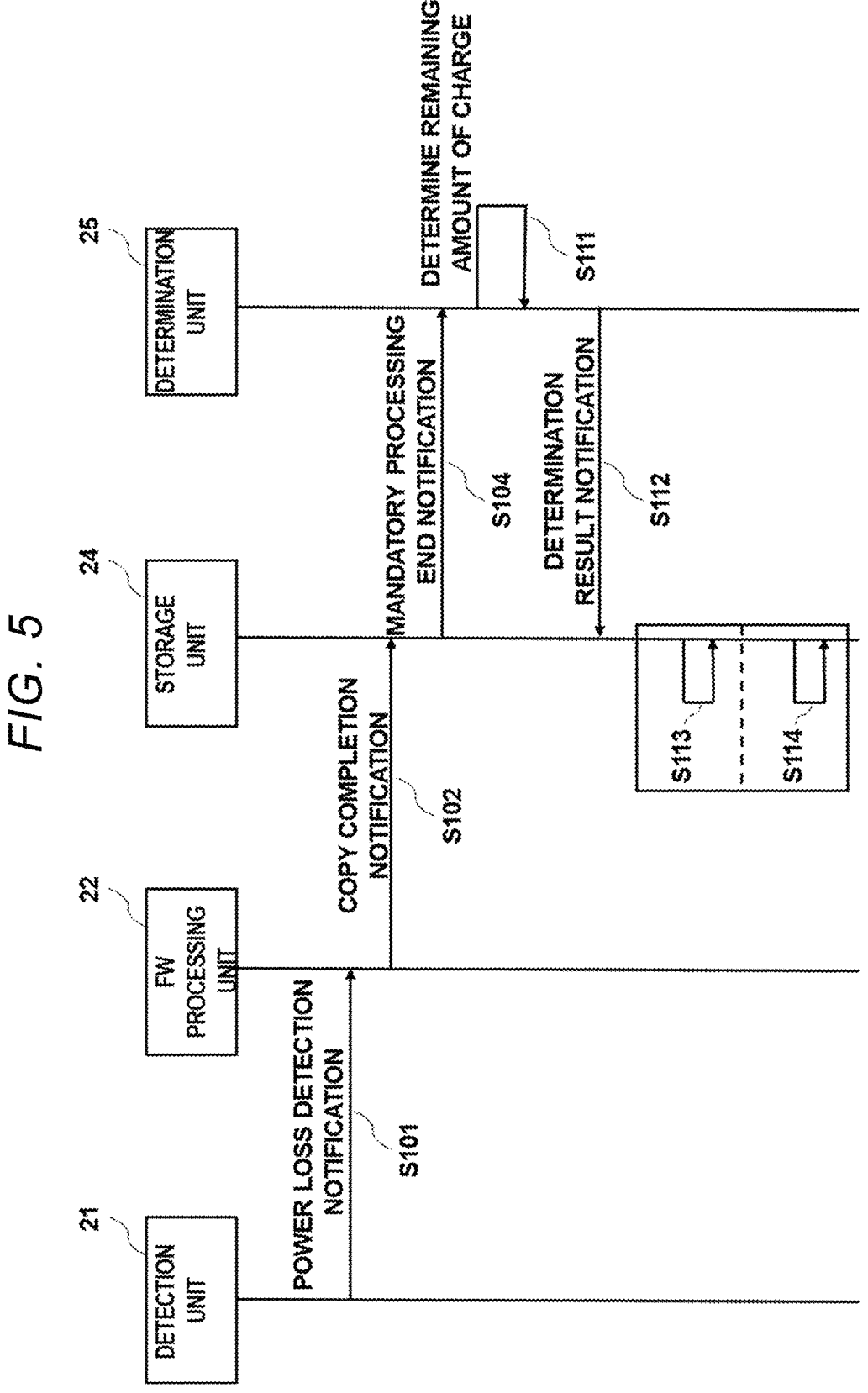
FIG. 5 is a sequence diagram showing an operation flow of the storage device according to the embodiment.

Next, an operation of the storage device 2 according to the present embodiment will be described with reference to FIG. 5. FIG. 5 is a sequence diagram showing an operation flow of the storage device 2 according to the embodiment.

When the power loss is detected, the detection unit 21 transmits the power loss detection notification indicating that the power loss is detected to the FW processing unit 22 (S101).

When the FW processing unit 22 receives the power loss detection notification from the detection unit 21, the FW processing unit 22 copies the bitmap that indicates what user data stored in the volatile memory 12 is valid from the non-volatile memory 11 to the FW work memory. The FW work memory is a region of the volatile memory 12 used during execution of the FW. When the copying of the bitmap to the FW work memory has completed, the FW processing unit 22 transmits a copy completion notification indicating that the copying of the bitmap to the FW work memory has completed to the storage unit 24 (S102).

When the storage unit 24 receives the copy completion notification from the FW processing unit 22, the storage unit 24 performs a non-volatilization process on the change logs and the valid user data stored in the volatile memory 12 to store them in the non-volatile memory 11. When the non-volatilization process has completed, the storage unit 24 transmits a mandatory processing end notification indicating that the mandatory PLP processing has ended to the determination unit 25 (S104).

When the determination unit 25 receives the mandatory processing end notification from the storage unit 24, the determination unit 25 determines the amount of charge remaining in the PLP capacitor 15 (S111).

When the amount of charge remaining in the PLP capacitor 15 is determined, the determination unit 25 transmits a determination result notification indicating a determination result of the amount of charge remaining in the PLP capacitor 15 to the storage unit 24 (S112).

When the storage unit 24 receives the determination result notification from the determination unit 25, the storage unit 24 performs processing according to the determination result as described above in conjunction with FIG. 4.

The determination unit 25 may determine whether the amount of charge remaining in the PLP capacitor 15 is sufficient. For example, the determination unit 25 may determine whether the amount of charge remaining in the PLP capacitor 15 is greater than a reference value at the end of the mandatory PLP processing. The determination unit 25 may acquire a physical quantity that is based on the remaining amount of charge and use this physical quantity to determine whether the amount of charge remaining in the PLP capacitor 15 is sufficient. The physical quantity that is based on the remaining amount of charge is, for example, a voltage of an electrode of the PLP capacitor 15 and a usable time of the PLP capacitor 15 calculated from the remaining amount of charge.

According to at least one embodiment, the controller 13 performs the mandatory PLP processing first in the PLP processing. Then, the controller 13 determines, based on the amount of charge remaining in the PLP capacitor 15, whether or not to perform the additional PLP processing. Even if the additional PLP processing is not performed, all of the data (e.g., the look-up table T) necessary for the operations of the storage device 1 still can be restored although the boot-up time may be longer. Through this structure, it is possible to reduce the cost of the storage device 1.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:
1. A storage device comprising:
a non-volatile memory;
a controller configured to control the non-volatile memory;
a volatile memory;

a power supply circuit configured to generate a power supply voltage using power supplied from an external power supply; and a capacitor, wherein the controller is configured to:

periodically store a hierarchical logical-to-physical address conversion table residing in the volatile memory into the non-volatile memory during normal operations, the hierarchical logical-to-physical address conversion table including an intermediate table and a lower table;

in response to a power loss event, determine after first data residing in the volatile memory has been stored into the non-volatile memory using the capacitor as a backup power supply, whether an amount of charge remaining in the capacitor is sufficient to store second data residing in the volatile memory into the non-volatile memory, the first data including change logs of the lower table, the second data including the intermediate table, store the second data residing in the volatile memory into the non-volatile memory in response to determining that the amount of charge remaining in the capacitor after the first data has been stored, is sufficient, determine, after the second data residing in the volatile memory has been stored into the non-volatile memory, whether an amount of charge remaining in the capacitor is sufficient to store third data residing in the volatile memory into the non-volatile memory, the third data including the lower table, and store the third data residing in the volatile memory into the non-volatile memory only if the amount of charge remaining in the capacitor after storing the second data is sufficient to store the third data residing in the volatile memory into the non-volatile memory; and after recovering from the power loss event, restore the intermediate table in the volatile memory using the intermediate table stored in the non-volatile memory during normal operations or using the second data which was stored into the non-volatile memory in response to the power loss event, and restore the lower table in the volatile memory using the lower table stored in the non-volatile memory during normal operations or using the lower table stored in the non-volatile memory during normal operations and the change logs of the lower table included in the first data which was stored into the non-volatile memory in response to the power loss event.

2. The storage device according to claim 1, wherein the controller is configured to:

after recovering from the power loss event, restore the intermediate table using the intermediate table stored in the non-volatile memory during normal operations if no changes were made thereto between the time the intermediate table was last stored into the non-volatile memory during normal operations and the power loss event, and restore the lower table using the lower table stored in the non-volatile memory during normal operations if no changes were made thereto between the time the lower table was last stored into the non-volatile memory during normal operations and the power loss event.

3. The storage device according to claim 1, wherein the controller is configured to:

after recovering from the power loss event, in response to determining that changes were made to the lower table between the time the lower table was last stored into the non-volatile memory during normal operations and the power loss event, restore the lower table using the lower table that was last stored into the non-volatile memory during normal operations and the change logs of the lower table, and restore the intermediate table using the intermediate table that was last stored into the non-volatile memory during normal operations and the restored lower table.

4. The storage device according to claim 1, wherein the controller is configured to:

after recovering from the power loss event, restore the intermediate table using the intermediate table stored in the non-volatile memory during normal operations if no changes were made thereto between the time the intermediate table was last stored into the non-volatile memory during normal operations and the power loss event, and restore the lower table using the lower table that was last stored into the non-volatile memory during normal operations and the change logs of the lower table.

5. The storage device according to claim 1, wherein the first data further includes valid user data.

6. The storage device according to claim 1, wherein the controller is further configured to:

if the amount of charge remaining in the capacitor after the second data has been stored is determined not to be sufficient, discard the second data residing in the volatile memory.

7. A control method for a storage device, the storage device including a non-volatile memory, a controller configured to control the non-volatile memory, a volatile memory, a power supply circuit configured to generate a power supply voltage using power supplied from an external power supply, and a capacitor, said control method comprising:

periodically storing a hierarchical logical-to-physical address conversion table residing in the volatile memory into the non-volatile memory during normal operations, the hierarchical logical-to-physical address conversion table including an intermediate table and a lower table;

detecting a power loss event;

in response to the power loss event, storing first data residing in the volatile memory into the non-volatile memory using the capacitor as a backup power supply, the first data including change logs of the lower table;

determining after storing the first data whether an amount of charge remaining in the capacitor is sufficient to store second data residing in the volatile memory into the non-volatile memory, the second data including the intermediate table;

determining that the amount of charge remaining in the capacitor after storing the first data is sufficient to store the second data residing in the volatile memory into the non-volatile memory;

storing the second data residing in the volatile memory into the non-volatile memory;

determining after storing the second data whether an amount of charge remaining in the capacitor is sufficient to store third data residing in the volatile memory into the non-volatile memory, the third data including the lower table;

storing the third data residing in the volatile memory into the non-volatile memory only if the amount of charge remaining in the capacitor after storing the second data is sufficient to store the third data residing in the volatile memory into the non-volatile memory; and after recovering from the power loss event, restoring the intermediate table in the volatile memory using the intermediate table stored in the non-volatile memory during normal operations or using the second data which was stored into the non-volatile memory in response to the power loss event, and restoring the lower table in the volatile memory using the lower table stored in the non-volatile memory during normal operations or using the lower table stored in the non-volatile memory during normal operations and the change logs of the lower table included in the first data which was stored into the non-volatile memory in response to the power loss event.

8. The control method according to claim 7, further comprising:

after recovering from the power loss event, restoring the intermediate table using the intermediate table stored in the non-volatile memory during normal operations if no changes were made thereto between the time the intermediate table was last stored into the non-volatile memory during normal operations and the power loss event, and restoring the lower table using the lower table stored in the non-volatile memory during normal operations if no changes were made thereto between the time the lower table was last stored into the non-volatile memory during normal operations and the power loss event.

9. The control method according to claim 7, further comprising:

after recovering from the power loss event, in response to determining that changes were made to the lower table between the time the lower table was last stored into the non-volatile memory during normal operations and the power loss event, restoring the lower table using the lower table that was last stored into the non-volatile memory during normal operations and the change logs of the lower table, and restoring the intermediate table using the intermediate table that was last stored into the non-volatile memory during normal operations and the restored lower table.

10. The control method according to claim 7, further comprising:

after recovering from the power loss event, restoring the intermediate table using the intermediate table stored in the non-volatile memory during normal operations if no changes were made thereto between the time the intermediate table was last stored into the non-volatile memory during normal operations and the power loss event, and restoring the lower table using the lower table that was last stored into the non-volatile memory during normal operations and the change logs of the lower table.

11. The control method according to claim 7, wherein the first data further includes valid user data.

12. The control method according to claim 7, further comprising:

determining that the amount of charge remaining in the capacitor after storing the second data is not sufficient; and discarding the second data residing in the volatile memory.

* * * * *